United States Patent [19]
Brister

[11] Patent Number: 5,779,917
[45] Date of Patent: Jul. 14, 1998

[54] PROCESS FOR SEPARATING FLUIDS HAVING DIFFERENT DENSITIES

[75] Inventor: Daniel L. Brister, Corpus Christi, Tex.

[73] Assignee: Fluid Technologies, Inc., Corpus Christi, Tex.

[21] Appl. No.: 695,265

[22] Filed: Aug. 9, 1996

[51] Int. Cl.$^6$ ................................................ B01D 21/24
[52] U.S. Cl. ........................ 210/800; 210/767; 210/534
[58] Field of Search ........................... 210/767, 800, 210/806, 416

[56] References Cited

U.S. PATENT DOCUMENTS 3,931,928  1/1976  Kido .
5,073,258  12/1991  Boullain, II et al. .............. 210/416.1

Primary Examiner—David A. Reifsnyder
Attorney, Agent, or Firm—Fulbright & Jaworski LLP

[57] ABSTRACT

A process of and device for separating fluids of different densities involving transporting the fluid mass from a turbulent flow region and into a laminar flow region and then into a further separation area having a geometry sufficient to provide for the natural separation of fluids due to fluid density and then forcing the separated fluids from the chamber by system backpressure.

4 Claims, 2 Drawing Sheets

PROCESS FOR SEPARATING FLUIDS HAVING DIFFERENT DENSITIES

BACKGROUND OF THE INVENTION

The present invention relates to a novel process and device for separating mixed fluids having different densities.

Separation of a mixed fluid containing components of different densities has been accomplished to date generally through one of two processes. The first process involves introducing the fluid into a large cistern or pool. As the cistern or pool fills, the fluid mixture flow rate is reduced to allow the different fluid densities to separate naturally into distinct layers. The pool or cistern must provide a large surface area to limit to a manageable level the depth of the lighter layer(s), which naturally gravitate to the top of the fluid body in an area generally referred to as the upper region. The primary feature or characteristic of this separation process is that removal of the top layer(s) involves a mechanical skimming process. The process involves a mechanical skimming device, such as a slitted pipe, that skims the top layer(s). Depending on the design and construction of the system, pumps may be required to pump the skimmed, less dense layer(s) from the collection pipe to a sump or other holding container or apparatus.

The second process heretofore used to separate fluids of different densities involves mechanical, primarily centrifugal, means. In this process, the fluid mixture is introduced into a device containing separate rotating chambers. Through motor drives, these chambers rotate at sufficient speeds to force the different density fluids into the different chambers. Pumps then remove the fluids to separate areas for continued processing. An example of this latter process is disclosed in U.S. Pat. No. 3,931,928.

Each of the above processes has the disadvantage of utilizing numerous mechanical devices, such as pumps, motors, etc., that suffer mechanical breakdowns and that require continuous human intervention. Another deficiency includes the need in these existing designs for continuous monitoring and adjustment by an operator in order to accommodate variations in demands for separation and processing of mixed fluids. Also, these existing designs require continuous maintenance and dedicated large areas in physical plants for the separation operation.

SUMMARY OF THE INVENTION

It is, therefore, an object of the present invention to provide a process and device for separating and collecting fluids of different densities utilizing natural means and backpressure to separate and remove separated fluids from the separation chamber.

Another object of the present invention is to provide a process and device for separating fluids of different densities with limited moving parts which do not require mechanical skimmers or centrifuges to remove the resulting separated fluid layers.

Yet another object of the present invention is to provide a process of a type described above which is performed in a series of self-contained and enclosed pipes and chambers and, thus, provides for controlled routing management and disposal of fluid fumes and gases in an environmentally safe manner.

Still another object of the invention is to provide a process and device for separating continuously and with measured precision a mixed fluid having fluids of different densities.

Additionally, it is an object of the present invention to provide a process and device for separating a mixed fluid having fluids of different densities which are independent of fluid amount processed and, thus, which require no operator intervention in order to accommodate variations in demand in fluid volume processed.

Still yet another object of the present invention is to provide a process and device for separating a mixed fluid having fluids of different densities which require little or no operator intervention.

Thus, in accordance with one aspect of the present invention, there is provided a process for separating fluids of different densities, comprising the steps of separating in a chamber a mixed fluid mass comprising fluids of different densities into fluid layers according to the densities, and subjecting the fluid mass to an adjustable backpressure sufficient to force at least the less dense fluid from the chamber. More particularly, the separating step involves introducing the fluid mass to conditions producing laminar flow, and collecting the laminar flow fluid mass in the separation chamber to allow the less dense fluids to form fluid layers above the heavier density fluids. Furthermore, the subjecting step involves applying an adjustable backpressure to the fluid mass. Preferably, the adjustable backpressure is produced by a fluid column having an adjustable height. Alternatively, the adjustable backpressure is produced by mechanical devices, such as pressure and flow regulators.

In accordance with another aspect of the present invention, there is provided a fluid separation device for separating fluids of different densities, comprising means for converting from turbulent to laminar flow a mixed stream of fluids having different densities, a separation chamber for separating the fluid stream into fluid layers according to their different densities, first means for passing less dense fluids from the separation chamber, second means for passing more dense fluids from the separation chamber, and adjustable backpressure means for forcing the lighter fluids to rise in the separation chamber sufficiently to flow through the first passage means. Preferably, the adjustable backpressure means includes a fluid column downstream of the separation column having an adjustable height. Alternatively, the adjustable backpressure means includes mechanical devices, such as pressure and flow regulators.

In another preferred embodiment, the first passage means comprises at least one pipe having a diameter sufficient to receive the maximum flow of the lighter fluids. Preferably, the first passage means is positioned at a height on the separation chamber corresponding to the location of the lighter fluids, and the height of the first passage means is adjustable. Additionally, the second passage means extends from the separation chamber in the region of the heavier fluid densities, and preferably comprises piping. The second passage means is sized to receive the maximum flow of the heavier fluids.

The current process and design provides many advantages over current separation processes and devices. For example, the present invention provides for forced separation of fluids of different densities by utilizing adjustable backpressure and a specially designed and positioned outlet for the lighter fluids. This process eliminates the need for skimmers, pumps, centrifuges and other mechanical devices currently required for such separation. Additionally, the present design is self-contained, thus, allowing the design to automatically contain and collect processing fumes and gases and to dispose of such fumes and gases in an environmentally-safe manner. Furthermore, the present process and design naturally generates the necessary flushing pressure for removing the fluids without the need for adjustments due to demand, flow or fluid composition.

Other and further objects, features and advantages will be apparent from the following description of presently preferred embodiments of the invention, given for the purpose of disclosure and taken in conjunction with the accompanying drawings.

DETAILED DESCRIPTION OF PREFERRED EMBODIMENTS

The present invention provides a unique process and design for allowing a mixed stream of fluids having different densities to separate into their constituent fluid layers and then removing the less dense fluid layer or layers from the remaining heavier fluid layer or layers. The unique process and design also provides for the removal of the heavy fluid(s) and/or solid(s). Thus, the present invention provides, in general, for the separation and collection of fluids of different densities from a mixed fluid stream.

In a typical fluid processing plant, wastewater or other contaminated fluids result from the contamination of water or other fluids utilized by a facility during its operation. For example, in a chemical plant, water streams perform a variety of functions and often are contaminated in a variety of ways by the various chemicals utilized during the plant's operation. Generally, the proportion of contaminant chemicals to water volume is low; however, the proportion may rise significantly if a failure, malfunction or mistake occurs. This wastewater must be treated and the contaminant chemicals removed before the water can be released into the environment or reused in the process.

Figure 1:
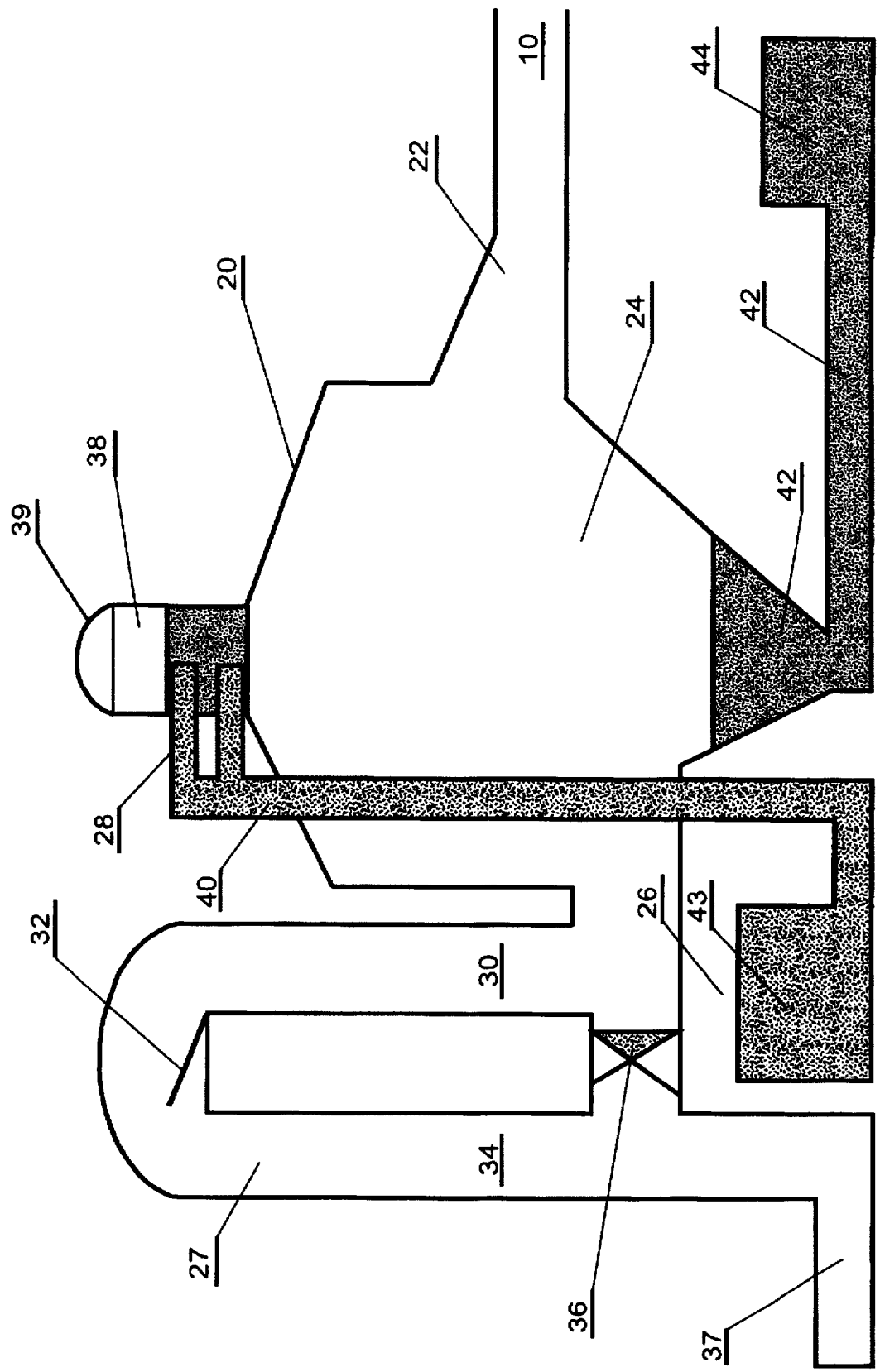
FIG. 1 is schematical representation of the present separator design.

As illustrated in FIG. 1, contaminated wastewater or other fluid is transferred through piping 10 to the separator, which is generally referred to at 20. The fluid is transferred to the separator of the present invention, for example, by pumps. Alternatively, if so constructed, the fluid may flow to the separation by gravity means. The contaminated fluid is collected from one or more upstream units. The upstream piping, process equipment and construction may take one of many designs. The separator 20 of the present invention includes a region 22, which is dimensioned and detailed to create a laminar flow condition in the mixed fluid stream which enters the region 22 under turbulent flow conditions through piping 10. More particularly, the region 22, which may be in the form of a pipe or a series of pipes, has a sufficiently large internal diameter to create the laminar flow condition. Laminar flow allows for the proper orientation of the fluids by their relative densities, i.e., the less dense fluids begin to accumulate on top of the more dense fluids. In the case of oils and water, the oils, which are typically less dense, begin to accumulate above the more dense water.

The laminar flow stream then enters the separation chamber 24. The interior capacity of the separation chamber 24 is designed to allow retention time and flow stabilization sufficient to result in the natural separation of the fluids due to their differences in density. The specific capacity of the chamber 24 is determined and will vary depending, among other things, upon the ranges of densities of fluids to be separated, and the maximum flow rate anticipated. The necessary capacity of the chamber is inversely proportional to the density differential of the fluids, i.e., the larger the differential the smaller the required capacity and vice versa.

The particular geometry of the chamber 24 may vary; however, the chamber geometry must allow the fluids to continually rise to avoid any jelling or caking problems. Also, the geometry of the bottom of the chamber should depend on the amount of solids to be precipitated to the bottom. Furthermore, the geometry of the chamber may vary depending upon other factors, such as density differential, fluid flow rate, fluid velocity and the volume of the least dense fluid(s) to be separated.

The chamber 24 has a mid-vessel outlet 26. The outlet 26 provides for controlled discharge of the heavier fluid(s) from the chamber 24. The control of the discharge is of critical importance. Particularly, according to the present invention, the discharge of the heavier fluid is controlled to create a backpressure on the fluid mass in the chamber 24. The selection of the backpressure and the decision to vary same are dependent upon a variety of factors, which include the composition and density differences among the components of the mixed fluid and the range of densities of the fluids to be separated. Additional factors include the configuration, height or both of the fluid maintained within the chamber and the elevation of the tops discharge outlet 28. Of particular importance in determining the backpressure to be applied to the chamber is a determination of the maximum flow rate.

The backpressure may be introduced to the chamber by a variety of ways. FIG. 1 illustrates one such option. As shown in FIG. 1, the mid-vessel outlet 26 leads to the backpressure system 27 through backpressure piping 30. The backpressure system 27 comprises vertical piping 30, 34, and baffle or weir 32. The backpressure piping 30 is designed to route the discharged heavier fluids upwardly in a column and over weir 32 or the like without introducing any significant pressure due to the flow of the fluid through the backpressure pipe 30. The upstanding fluid column creates a backpressure against the fluid mass in the chamber. The height dimensions and configuration is determined by considering the dimensions of the separation chamber 24, the fluid flow rate and velocity, the fluid mixture composition, and the desired fluid densities to be separated or collected. The equivalent height of the column or, in other words, the backpressure, may be adjusted during operation by altering the setting of weir 32 or other similar device, such as a pressure valve, which affects and/or controls the setting of the backpressure.

In addition to the fluid column, the backpressure also may be introduced to the system by a pressure regulator or a flow regulator positioned at the mid-vessel outlet 26 or along backpressure piping 30. Additionally, a flow regulator positioned, for example, in the vicinity of the tops discharge outlet 28 may be utilized to control flow through discharge 28.

The discharged mixture of heavier fluid(s) continues travelling over the baffle or baffle/weir and through piping 34 and outlet 37 to further treatment. If this fluid is water for example, it may be released to holding tanks for further processing before being released to the environment.

A valve 36 can be included in the apparatus to allow for direct gravity or other discharge of the chamber if required. Other such discharge devices are well-known to those skilled in the art. In addition, a pressure equalization tube may be positioned between the enclosed weir section and the separator stack to balance fluid levels and vapor pressure.

Returning now to the chamber 24, an important feature of the design is the separation stack 38, which is a region of decreased chamber volume in the upper portion of the chamber. As such, the less dense fluid is concentrated in this region. As will be made clearer below, this result does not allow the less dense fluid to become static and solidify.

The separation stack 38 includes a cover 39, which encloses the separation chamber and prevents fluid gases from escaping to the environment. Hence, the present design provides desirous environmentally-safe features. Though not shown in FIG. 1, a vapor or fume discharge outlet can be added to separation stack 38 of the chamber to serve as an exhaust for the vapor. The outlet can be connected to piping which will transport the vapor for further processing. Such processing could include venting to flares or thermal oxidizers. Additionally, it could be located between the separation chamber and separation stack to facilitate maintenance of the separation stack.

As discussed above, tops discharge outlet 28 is provided in the separation stack 38 of the separation chamber to provide for discharge and collection of the less dense fluids which are forced to the top of the chamber. In the embodiment of FIG. 1, one such outlet is provided. The number of outlets is a matter of design choice. More importantly, the discharge capacity of the outlet or outlets and the associated piping must be greater than the volume of less dense fluid to be discharged from the chamber 24.

The vertical location or elevation of the tops discharge outlet 28 is determined by the amount of backpressure applied to the fluid in the chamber 24 and is in the region of the lighter density fluid(s). Once the height is selected, the different density fluids in chamber 24 will seek levels in the chamber that result in a pressure equal to that of the backpressure. Those heights will be determined by the respective volume and density of each fluid comprising the fluid mass. This arrangement will assure that the less dense fluid(s), but not the more dense fluid, is discharged by the effect of the backpressure acting on the fluid mass in the chamber. In general, through the combination of the height to the outlet 28 and the setting of the backpressure, the dividing density line is established between the fluid(s) that are separated or collected and those that are allowed to be discharged or passed through the separator.

The tops discharge outlet 28 is connected to tops discharge piping 40. The less dense fluid flows through the tops discharge piping 40 and to tops collection vessel 43 to be further processed.

The chamber 24 preferably includes a bottoms collection zone 41. Quite typically, a mixed fluid stream from a process will include particulate matter which will collect in the separation chamber and settle to the bottom of the chamber. According to FIG. 1, the denser material collected in bottoms collection zone 41 may be pumped or otherwise transported through bottoms discharge piping 42 to a sludge tank 44 and disposed of in one of many acceptable manners.

Figure 2:
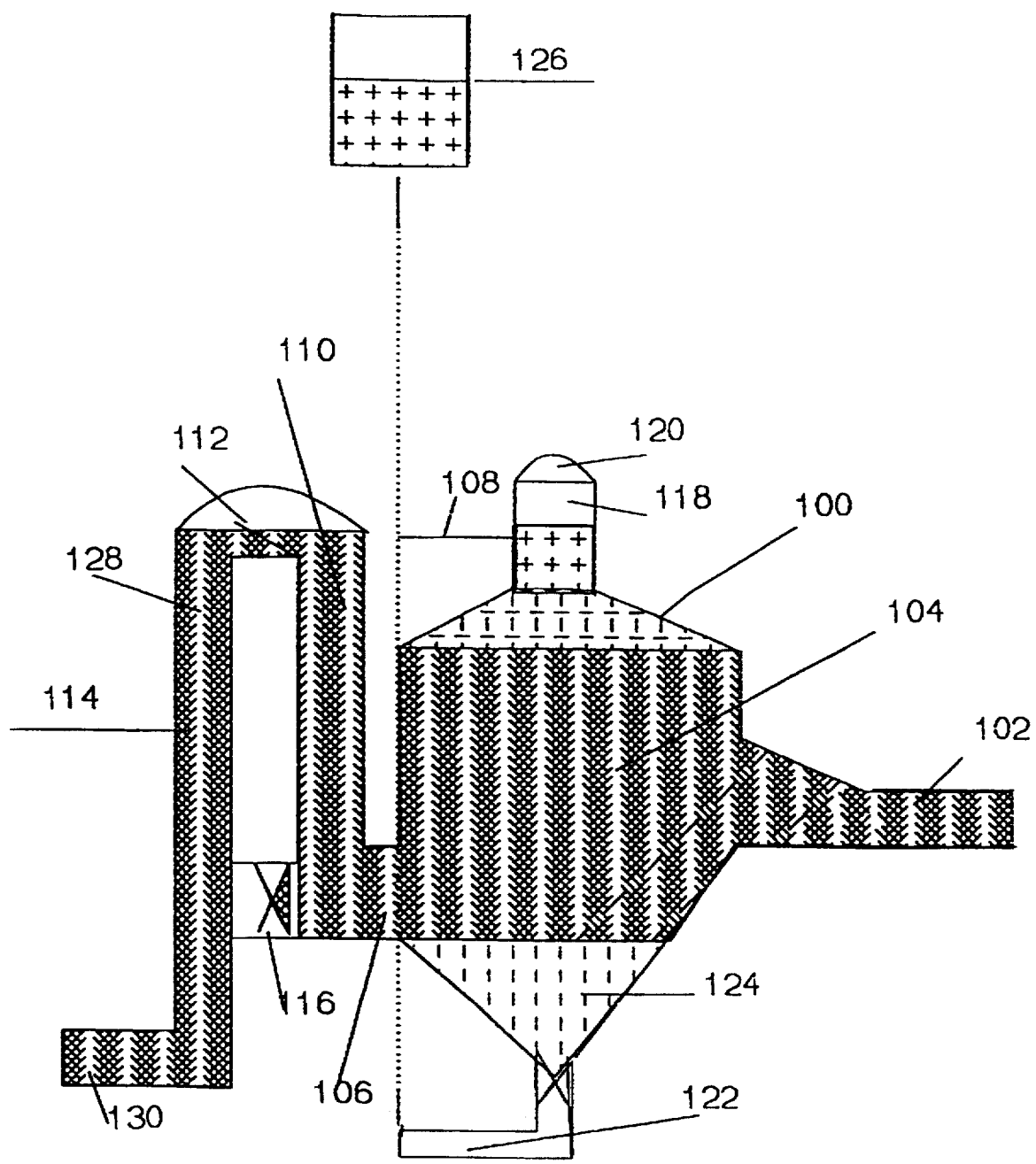
FIG. 2 is a schematic representation of another embodiment of the present separator design.
Figure 1:
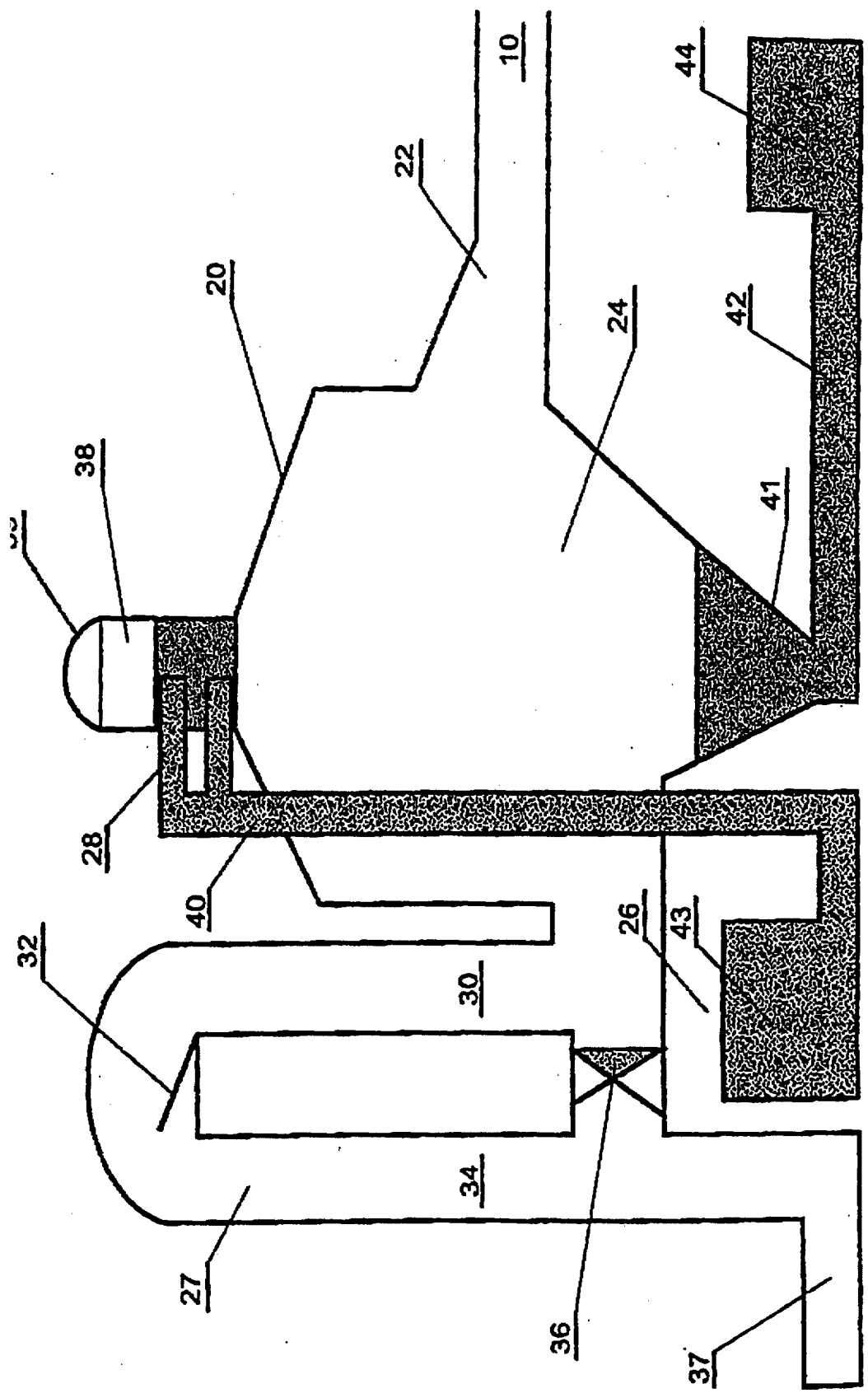
Figure 2:
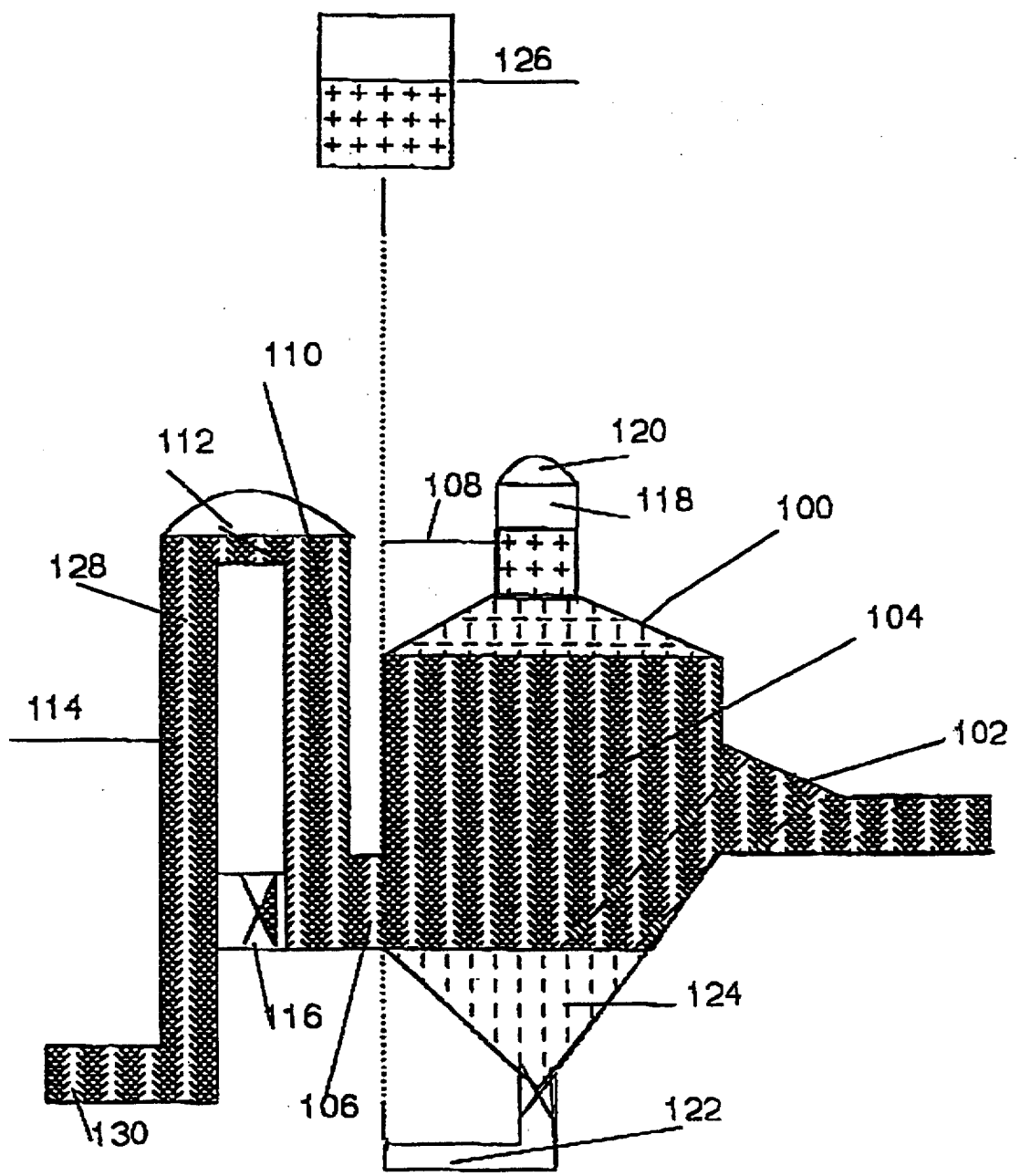

Another example of the present separator is illustrated in FIG. 2. Like separator 20, the second separator 100 of FIG. 2 includes a laminar flow region 102, a separation chamber 104, mid-vessel outlet 106, tops discharge outlet 108, backpressure piping 110, a baffle or weir 112, backpressure piping 114, valving 116, a decreased upper region 118 and cover 120. The separator 100 differs from separator 20 in that the outlet 108 and bottoms discharge piping 122 merge. This design results from the fact that the suspended solids are removed from the mixed inlet flow by two processes. First, dissolved air existing in the inlet flow rises in the separation chamber 104 and carries with it suspended solids. Second, suspended solids not affected by the dissolved air or other gas may settle to the bottom 124 of the chamber and be removed through bottoms discharge piping 122. The suspended solids from both tops discharge outlet 108 and bottom discharge piping 122 are joined and forwarded to a solids collection vessel 126. A block valve, not shown, may be necessary in the piping 122 to regulate flow. The fluid without the removed solids may be discharged from the chamber 104 through mid-vessel outlet 106. As with separator 20, the separator 100 is designed with a backpressure system 128, which, as in FIG. 1, comprises a vertical piping 110, 114 and baffle 112 construction. The fluid flowing through system 128 applies a backpressure to the fluid mass in the chamber to provide a level control to achieve separation of the fluids according to their different densities. The treated fluid leaving the chamber through mid-vessel outlet 106 and passing through the backpressure system 128 exits the separator/backpressure system through piping 130.

The capacities, materials of construction, and geometry of the system of the present invention depend upon a number of factors, including the maximum amount of product, the types of product, and the density differential of the products to be separated. In a preferred embodiment, the piping 10, region 22, and separation chamber 24 may be constructed from a variety of materials, as long as the material does not interact with, impede, or otherwise affect the flow of the mixture. Preferred materials include non-corrosive steel, polyvinyl chloride, iron or fiberglass. Generally, flammable or permeable materials are not well-suited. Generally, the piping, separation chamber, and region 22 are constructed from the same material.

The internal diameter of the pipe 10 varies according to flow rate and is not limiting. In a preferred embodiment, the piping has an internal diameter of about 2–30 inches and accepts flow rates of about 10 to 1000 gallons per minute (gpm).

The piping 22 can assume a variety of sizes and shapes. Generally speaking, the piping's internal dimension is larger than piping 10 to initiate the separation of the fluids by changing the flow from turbulent to laminar flow. For example, if the piping 10 is 10 inches, then the piping 22 could be 20 or more inches. In a preferred embodiment, the piping 10 and 22 are both cylindrical. In other embodiments, the piping 22 in the section approaching the separation chamber could be tapered so as to have an internal diameter equal to piping 10 where they mate and increasing to a larger internal diameter as it approaches the separation chamber. One advantage to this later design is that it enhances laminar flow and improves separation. Disadvantages include the cost of the non-uniform construction.

The separation chamber may assume a variety of geometries. A preferred geometry includes a cylindrical main chamber, sloping walls extending vertically and inwardly from the top of the main cylindrical chamber towards the centerline of the cylinders and a cylindrical separation stack 38 extending vertically above the slopping walls. In other embodiments, the separation chamber includes an additional section at the top of the separation stack designed to collect and remove vapors caused by the products. These vapors can be vented to flares or thermal oxidizers. Additionally, in other embodiments, for example, a fluid control valve is located between the separation chamber and separation stack to facilitate maintenance of the separation stack.

Generally, the outlet piping 28, 30, 34, and 40 is constructed of the same material as the separation chamber and other piping. It generally assumes a circular cross section.

It will be readily apparent that the present invention is applicable to any process involving the separation of fluids having different densities and acceptable viscosities. For example, the invention may be utilized for water, sludge and product separation of refineries, and for marine oil spillage containment and clean-up. In addition, the present invention may be used in city water treatment plants, city sewage plants, and power plants. The present invention is particularly applicable for use in water-based systems.

The present invention will be described below by way of examples.

EXAMPLE 1

A fluid mixture containing oil and water flowing from various units in a refinery mixes and flows through piping 10 to the separation unit 20. The mixture contains water of a weight of 8.33 lbs. per gallon and a contaminant oil of a weight of 7.5 lbs. per gallon. The flow rate of the fluid is 500 gpm and comprises 475 gallons of $H_2O$ and 25 gallons of oil. As the water-oil mixture flows from the units to the separator, it flows through piping 10 constructed of a non-corrosive steel having an internal diameter of 10 inches.

As the fluid approaches the separator, it enters region 22. Region 22 has a length of 10 feet and an internal diameter of 20 inches and is constructed of non-corrosive steel with rated strength sufficient to handle the designed pressures resulting from hydrostatic pressure or maximum surges in flow rate. The reason for increasing the interior diameter of this piping immediately prior to the separation chamber is to start the fluid mixture into a laminar flow. It achieves this result by slowing the velocity of the fluid mixture and allowing it to begin natural separation into respective densities prior to entering the separation chamber. The lighter density fluid, in this embodiment oil, begins to flow to the top of the fluid mixture, while the water begins to settle to the bottom of the fluid mixture. The separation of the fluid into its respective layers decreases the necessary time in the separation chamber, therefore minimizing the required capacity of the separation chamber. In an embodiment with more than two fluids in the mixture, the fluids would still gravitate to their relative density layers. There is no maximum number of different fluids that may be handled by the present invention.

The fluid mixture exits region 22 and enters the separation chamber 24. The separation chamber is constructed of non-corrosive steel with a strength sufficient to handle anticipated pressures. The particular shape of the separation chamber in this example is cylindrical with a tapering top to the separation stack. The height of the cylinder is 18.666 feet with an interior diameter of approximately 24 feet. The top of the separation chamber slopes inwardly and upwardly so as to increase the height by an additional foot for a total height of the separation chamber of 19.666 feet. The separation chamber at the top of the 1-foot slope, is connected to the separation stack 38, which is located in the center of the assembly. The separation stack is cylindrical and has an internal diameter of 10 inches. The height of the separation stack is 3.115 feet, for a total height of the separation chamber/stack assembly of 22.782 feet. The top of the separation stack is enclosed and is constructed of non-corrosive steel.

The height of the bottom of the product outlet tube 28 in this embodiment is 20.25 feet higher than the top of outlet 26 leaving the chamber and the internal diameter of the product outlet pipe is 4 inches. The pipe is cylindrical in shape and is made of non-corrosive steel of sufficient strength to handle designed pressures.

The water in this embodiment flows through the separation chamber and outlet 26 and to the backpressure piping 30. In this embodiment, the outlet is located at the bottom of the separation chamber directly across from the 20-inch pipe inlet section which introduces the mixture into the chamber and extends horizontally from the chamber. The internal diameter of this piping 26 is large enough to not restrict the flow of the fluid leaving the chamber and in this embodiment is 20 inches. This piping is cylindrical in shape and is constructed of non-corrosive steel. The length of the outlet 26 is approximately 3 feet. Piping 30 also has an internal diameter of 20 inches and is constructed of non-corrosive steel. The three foot horizontal outlet piping has a 90° bend to form an upstanding backpressure column. The piping 30 enters the bottom of the weir box which has a height of 3 feet, a length of 6 feet, and a width of 15 feet. The weir box is constructed of non-corrosive steel and is rectangular in shape. The weir is located at the center of the weir box in the center of the fluid flow path. It is constructed of non-corrosive steel and is 13.3686 feet wide and is held in place by bolts. Its height can be adjusted by bolting at a particular height within its range of motion. In this example, the weir is positioned such that its top is 19 feet, 11 inches from the top of the outlet 26. The weir width allows 1 inch of water height, which thus provides a water height of 20 feet flowing over the weir from the top of the outlet 26.

The water flows over the weir and to a vertical pipe 34 having an internal diameter of 20 inches. The piping 34 has a length of 19 feet 8 inches and terminates in a right angle pipe at the base of the backpressure piping. The water flows from piping 34 to a downstream tank for additional processing.

The back pressure column pivots at the inside top of outlet 26. The water height of the backpressure column exerts a constant hydrostatic backpressure of 8.66 psi. This results in the mixed fluid being present in the separator as 17.74 feet of water having a partial pressure of 7.68 psi and 2.51 feet of oil having a partial pressure of 0.98 psi.

EXAMPLE 2

In a second example, a different contaminant having a weight of 6 pounds/gallon is used. The equipment used is the same as in Example 1. According to this example, the fluid mixture in the separator is present with the water having a partial pressure of 8.38 psi and a height of 19.36 feet and the contaminant having a partial pressure of psi and a height from the top of the inside of outlet 26.

EXAMPLE 3

This example demonstrates how the height of lighter fluids differ due to varying weir heights. In this example, the same equipment as in Example 1 is used, except that the product outlet pipe is at a height of 20.33 inches instead of 20.25 inches. The height of the backpressure water column is 20 feet, with the top of the weir being 19 feet, 11 inches above outlet 26 and the water height overflowing the weir is 1 inch.

The heavier fluid is again water, having a weight of 8.33 pounds/gallon and the contaminant is an oil having a weight of 7 pounds/gallon. The water, therefore, is present in the separator at a height of 15.09 feet and applies a partial hydrostatic pressure of 6.53 psi. The oil is present in the separator at a height of 5.24 feet and applies a partial hydrostatic pressure of 2.12 psi. The combined hydrostatic pressures of the fluids in the separation chamber equals the hydrostatic pressure of the backpressure column.

EXAMPLE 4

In this example, the height of the weir is raised 3 inches and, thus, the height of the backpressure column is 20.25 feet above outlet 26. Thus, the difference in height between the backpressure column (20.25 inches) and the outlet pipe (20.33 inches) is 1 inch. Accordingly, the change in height of the weir results in a hydrostatic backpressure of 8.76 psi/foot. The backpressure creates a separation of the mixed fluids in the separator or such that the water applies a hydrostatic partial pressure of 8.23 psi at a height of 19.02 feet and the contaminant fluid applies a hydrostatic backpressure of 0.53 psi at a height of 1.31 feet.

As can be appreciated, the process and design of the present invention provides for the forced separation of the mixed fluid stream utilizing the physical properties of the fluids, including density and adjustable backpressure, rather than mechanical skimmers, centrifuges or other mechanical devices. The system is easy to design and operate. It is not subject to the level of mechanical breakdown experienced with conventional processes and designs. Being enclosed, it also provides easy control of vapor pollutants and gases associated with many open air separation tanks.

The present invention, therefore, is well-adapted to carry out the objects and attain the ends and advantages mentioned, as well as others inherent therein. While presently preferred embodiments of the invention have been given for the purpose of disclosure, numerous changes in the details of construction, arrangement of parts, and steps of the process, may be made which will readily suggest themselves to those skilled in the art and which are encompassed within the spirit of the invention and the scope of the appended claims.

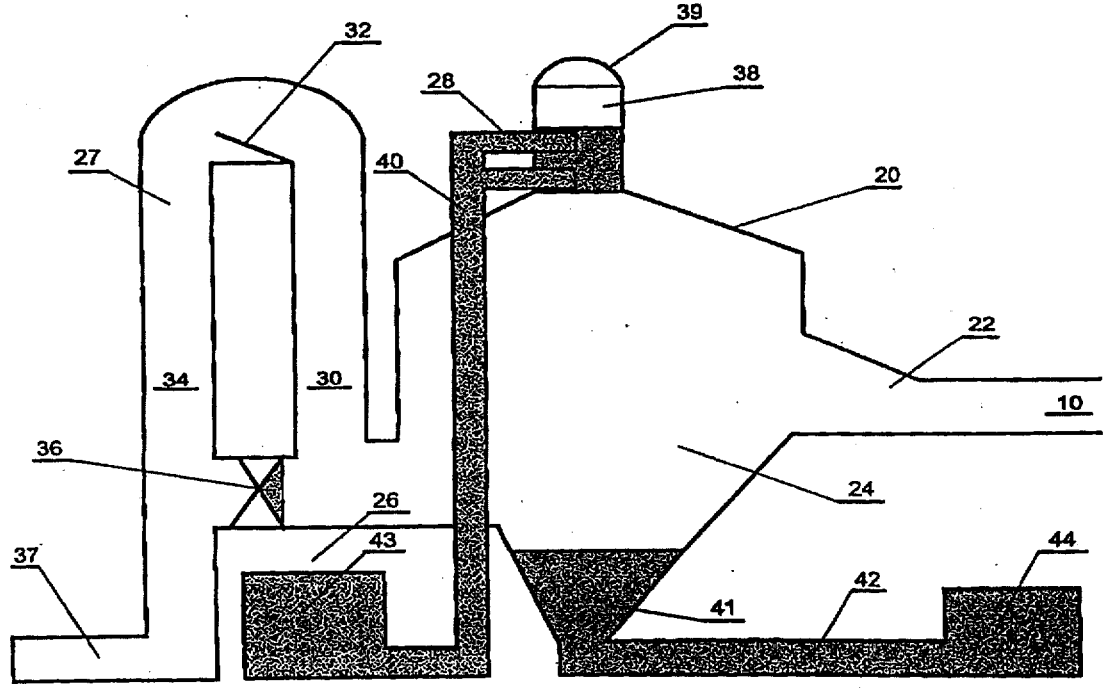

What is claimed is:

1. A process for separating fluids of different densities, comprising the steps of:

passing a turbulent flow mixed fluid stream which comprises fluids of different densities into means for producing laminar flow;

passing said laminar flow fluid stream into a separation chamber to allow said fluid stream to separate into individual fluid layers according to fluid density; and subjecting said fluid layers to a positive internal pressure sufficient to cause said fluid layers to rise in said chamber and force at least said lowest density fluid from said chamber.

2. A process as claimed in claim 1, wherein said subjecting step involves applying an adjustable backpressure to said fluid mass.

3. A process for separating fluids as claimed in claim 2, wherein said adjustable backpressure is produced by a fluid column having a adjustable height.

4. A process for separating fluids as claimed in claim 2, wherein said adjustable backpressure is produced by a mechanical pressure device.

* * * * *

UNITED STATES PATENT AND TRADEMARK OFFICE
CERTIFICATE OF CORRECTION

PATENT NO. : 5,779,917
DATED : July 14, 1998
INVENTOR(S) : Daniel L. Brister

Page 1 of 4

It is certified that error appears in the above-identified patent and that said Letters Patent is hereby corrected as shown below:

The title page, showing the illustrative figure, should be deleted and substitute therefor the attached title page.

The drawing sheets, consisting of Figs. 1 and 2, should be deleted to be replaced with drawing sheets 1 and 2, as shown on the attached page.

In column 8, line 44, please delete "from the top of the inside of outlet 26."

In column 8, line 45, insert -- of 0.89 feet --.

Signed and Sealed this

Twenty-sixth Day of January, 1999

Attest:

Attesting Officer

*Acting Commissioner of Patents and Trademarks*

United States Patent [19]

Brister

[11] Patent Number: 5,779,917

[45] Date of Patent: Jul. 14, 1998

[54] PROCESS FOR SEPARATING FLUIDS HAVING DIFFERENT DENSITIES

[75] Inventor: Daniel L. Brister, Corpus Christi, Tex.

[73] Assignee: Fluid Technologies, Inc., Corpus Christi, Tex.

[21] Appl. No.: 695,265

[22] Filed: Aug. 9, 1996

[51] Int. Cl.⁶ .................................................. B01D 21/24
[52] U.S. Cl. .......................... 210/800; 210/767; 210/534
[58] Field of Search .................................... 210/767, 800, 210/806, 416

[56] References Cited

U.S. PATENT DOCUMENTS 3,931,928  1/1976  Kido .

5,073,258  12/1991  Boullain, II et al. ............. 210/416.1

Primary Examiner—David A. Reifsnyder
Attorney, Agent, or Firm—Fulbright & Jaworski LLP

[57] ABSTRACT

A process of and device for separating fluids of different densities involving transporting the fluid mass from a turbulent flow region and into a laminar flow region and then into a further separation area having a geometry sufficient to provide for the natural separation of fluids due to fluid density and then forcing the separated fluids from the chamber by system backpressure.

4 Claims, 2 Drawing Sheets